United States Patent
Aragón et al.

(10) Patent No.: US 12,313,594 B2
(45) Date of Patent: May 27, 2025

(54) ULTRASONIC TRANSDUCER AND ULTRASONIC FLOWMETER

(71) Applicants: KROHNE AG, Basel (CH); Technische Universiteit Delft, Delft (NL)

(72) Inventors: Alejandro Marcos Aragón, Delft (NL); Sabiju Valiya Valappil, Delft (NL); Cornelis Johannes Hogendoorn, Spijk (NL)

( * ) Notice: Subject to any disclaimer, the term of this patent is extended or adjusted under 35 U.S.C. 154(b) by 183 days.

(21) Appl. No.: 18/048,774

(22) Filed: Oct. 21, 2022

(65) Prior Publication Data
US 2023/0130690 A1 Apr. 27, 2023

(30) Foreign Application Priority Data
Oct. 22, 2021 (EP) .................................... 21204188

(51) Int. Cl.
*G01N 29/024* (2006.01)
*G01F 1/66* (2022.01)
(Continued)

(52) U.S. Cl.
CPC .......... *G01N 29/024* (2013.01); *G01F 1/667* (2013.01); *G01F 1/662* (2013.01); *G10K 11/04* (2013.01)

(58) Field of Classification Search
CPC ....... G01N 29/024; G01F 1/667; G01F 1/662; G10K 11/04
See application file for complete search history.

(56) References Cited

U.S. PATENT DOCUMENTS

| 4,417,480 A | 11/1983 | Zacharias, Jr. |
| 11,074,901 B2 | 7/2021 | Delpero et al. |

(Continued)

FOREIGN PATENT DOCUMENTS

| CN | 109036367 A | 12/2018 |
| CN | 113187840 A | 7/2021 |

(Continued)

OTHER PUBLICATIONS

Microfabricated phononic crystal devices and applications, R H Olsson III and I El-Kady, Measurement Science and Technology, vol. 20, No. 1, Citation R H Olsson III and I El-Kady 2009 Meas. Sci. Technol. 20 012002, DOI 10.1088/0957-0233/20/1/012002.

(Continued)

*Primary Examiner* — Jonathan M Dunlap
*Assistant Examiner* — John M Royston
(74) *Attorney, Agent, or Firm* — Patrick D. Duplessis (57) ABSTRACT

An ultrasonic transducer for an ultrasonic flowmeter includes a transducer housing and a transducer element arranged in the transducer housing for generating and/or receiving ultrasonic signals at least in a useful frequency range of the ultrasonic transducer. The transducer housing has an ultrasound window in the region of the transducer element for transmitting the ultrasound signals between the interior and the exterior of the transducer housing. The transducer housing has a fastening section for fastening the ultrasonic transducer to a measuring tube. The transducer housing extends with a transition section between the ultrasound window and the fastening section. The transition section of the transducer housing has, in an attenuation region, a phononic crystal with an acoustic band gap in the useful frequency range, so that the transmission of ultrasonic signals in the useful frequency range between the ultrasound window and the fastening section is at least attenuated.

15 Claims, 6 Drawing Sheets

(51) Int. Cl.
   *G01F 1/667*   (2022.01)
   *G10K 11/04*   (2006.01)

(56)           References Cited

U.S. PATENT DOCUMENTS

2017/0307425 A1   10/2017   Berberig et al.
2021/0063048 A1*   3/2021   Bouche ................. F24F 13/24

FOREIGN PATENT DOCUMENTS

EP        1340964 B1    2/2005
EP        2148322 B1    3/2017
EP        3239973      11/2017
EP        1340964       9/2023

OTHER PUBLICATIONS

Armenise, Mario Nicola, Carlo Edoardo Campanella, Caterina Ciminelli, Francesco Dell'Olio and Vittorio M. N. Passaro. "Phononic and photonic band gap structures: modelling and applications." Physics Procedia 3 (2010): 357-364.
Vasileiadis, Thomas, Jeena Varghese, Visnja Babacic, Jordi Gomis-Bresco, Daniel Navarro Urrios and Bartlomiej Graczykowski. "Progress and perspectives on phononic crystals." Journal of Applied Physics 129 (2021): 160901.
Guerder, Pierre-Yves. "Phononic crystals and their applications." (2013).
Roque, Anita Juan. Thesis: "Analysis of the Acoustic Properties of Phononic Crystals By Modifying Their Temperature and the Geometry of the Dispersers". (May 2019). [Spanish with machine-translated English version provided].

* cited by examiner

ULTRASONIC TRANSDUCER AND ULTRASONIC FLOWMETER

TECHNICAL FIELD

The invention relates to an ultrasonic transducer for an ultrasonic flowmeter, having a transducer housing and having a transducer element arranged in the transducer housing for generating and/or receiving ultrasonic signals at least in a working frequency range of the ultrasonic transducer, wherein the transducer housing has an ultrasound window in the region of the transducer element for transmitting the ultrasound signals between the interior and the exterior of the transducer housing, wherein the transducer housing has a fastening section for fastening the ultrasound transducer to a measuring tube, and wherein the transducer housing extends with a transition section between the ultrasound window and the fastening section. In addition, the invention also relates to an ultrasonic flowmeter having at least two of the previously described ultrasonic transducers and a measuring tube.

BACKGROUND

Ultrasonic flow meters of the aforementioned type are known in various forms from the prior art and are used to determine the flow of a flowing medium through the measuring tube. For this, ultrasonic flowmeters generally have at least two ultrasonic transducers, which are designed as ultrasonic transmitters and/or ultrasonic receivers and are arranged at a distance from one another in the direction of flow of the medium (axially relative to the measuring tube axis). To determine the flow rate, an ultrasonic signal is transmitted along a signal path between the ultrasonic transducers, once in the direction of flow of the medium and once against the direction of flow of the medium, and the transit time of the ultrasonic signal or signals, which differ from one another due to the entrainment effect of the medium, is determined. The flow velocity of the medium can be determined from the difference in transit time, and the volumetric flow rate of the medium is obtained from the flow velocity and the measuring tube cross section.

The ultrasonic signals are generated and received by the transducer element located in the transducer housing. The transducer elements are usually implemented by electromechanical components whose operating principle is based on the piezoelectric effect, so that one and the same transducer element can be used simultaneously as a transmitter and receiver element. The ultrasonic signals are transmitted into the measuring tube via the ultrasound window of the transducer housing or received via the ultrasound window of the transducer housing.

The ultrasound window of the transducer housing is often acoustically optimized, for example by a suitably selected thickness and/or by additional matching layers. Thus, the ultrasound window can provide acoustic impedance matching so that better transmission of ultrasound waves into and out of the medium occurs. It is helpful for the impedance matching that the working frequency range of the used ultrasonic signals is known, so that this boundary condition can be taken into account for the interpretation of the impedance matching.

However, ultrasonic signals are not only transmitted as working signals via the medium from one ultrasonic transducer to the other ultrasonic transducer, but also propagate as parasitic housing waves in the structural components of the ultrasonic flowmeter, namely in the transducer housing and in the measuring tube. This circumstance is called crosstalk.

The problem with crosstalk is that the receiving ultrasonic transducer cannot distinguish whether the received ultrasonic signal is a working signal or an interfering signal caused by the housing waves, or that the working signal and the interfering signal are superimposed, resulting in a poor signal-to-noise ratio, ambiguous measurement situations and reduced measurement accuracy.

In media with low characteristic impedance, such as gases or vapors as well as liquids with high viscosity, the transmitted ultrasonic signal is strongly attenuated by the medium, so that only a weak ultrasonic signal (measurement signal) arrives at the receiving ultrasonic transducer. In such cases, in particular, the superimposition of the working signal with interference signals caused by crosstalk is problematic.

Various measures for reducing crosstalk are known from the prior art. It is known from EP 2 148 322 B1, for example, to form at least one mechanical resonator in the transducer housing, which the housing waves must inevitably pass through during their propagation. The mechanical resonator is excited to oscillation by the housing waves, the energy of the housing waves is thus trapped locally and crosstalk is reduced.

A configuration is known from EP 1 340 964 B1 in which a mechanical sound filter is formed in the transducer housing of an ultrasonic transducer. The sound filter has a torsion ring which is excited to torsional movements by housing waves. The sound filter is designed in such a way that, at frequencies in the operating range of the ultrasonic transducer, an almost motionless state of the torsion ring is achieved, which reduces crosstalk.

A disadvantage of the design of mechanical resonators and mechanical sound filters is, on the one hand, the complexity of the structures with which an increased production and cost expenditure is associated and, on the other hand, that the mode of action of the mechanical constructions is tuned to certain frequencies of the ultrasonic signals, so that only housing waves in a narrow frequency range are "filtered out".

SUMMARY

Thus, the object of the invention is to further develop the ultrasonic transducer described at the beginning and the ultrasonic flowmeter described at the beginning in such a way that the propagation of housing waves and thus the crosstalk can be prevented or at least minimized in an efficient and cost-effective manner.

In the ultrasound transducer according to the invention, the object is first achieved, namely with the disclosed features, in that the transition section of the transducer housing has, in an attenuation region, at least one phononic crystal with an acoustic band gap in the working frequency range of the ultrasound transducer, so that the transmission of ultrasound signals in the working frequency range between the ultrasound window and the fastening section is at least attenuated.

Phononic crystals are understood to be materials that have a macroscopic periodic structure that is formed analogously to a microscopic crystal structure; a microscopic crystal structure is thus mimicked macroscopically. Using suitable dimensioning of the macroscopic phononic crystal structure, it is possible that the phononic crystal does not transmit—or transmits only strongly attenuated—mechanical and acoustic waves of a determined wavelength or in a limited wavelength range and, thus, vibrations of a determined frequency or correspondingly in a limited frequency range. With respect to the transmission of these mechanical and acoustic waves, the phononic crystal thus exhibits a band gap in the relevant frequency range. Due to the periodic structural design of phononic crystals, areas of different density and/or elasticity alternate, whereby band gaps can also specifically emerge in the ultrasonic range, in this case in the working frequency range of the ultrasonic waves of the ultrasonic transducer under consideration. The physical mechanism behind the attenuation is Bragg scattering of the mechanical and acoustic waves on the periodic structure of the phononic crystal.

The analysis of the oscillation behavior of the periodic structures of the phononic crystals can be carried out before the actual technical implementation, if geometry and used material are known. For this, on the one hand, methods of solid-state physics can be used which are known for the description of crystal structures, i.e., for example, working with unit cells, Brillouin zones and Bravais lattices. On the other hand, the oscillation behavior of the desired geometries can be investigated by numerical simulations (for example, by the finite element method or the boundary element method). For example, the vibrational or attenuation behavior of the phononic crystal can be investigated for all oscillation modes and frequencies of interest.

Now, by using the previously described phononic crystals in the transition section between the ultrasound window and the fastening section in an attenuation region, the transmission of ultrasonic waves in the working frequency range of the ultrasonic transducer via the transducer housing is impeded. Since parasitic ultrasonic waves in an ultrasonic flowmeter from one ultrasonic transducer to another ultrasonic transducer must necessarily also pass through the transducer housings of the ultrasonic transducers involved, the measure according to the invention of using phononic crystals in the attenuation region of the transducer housing is an effective measure to suppress parasitic ultrasonic waves. It makes sense to place the band gap of the phononic crystals in the working frequency range of the ultrasonic transducer. Interfering signals in the working frequency range are practically indistinguishable from working signals, at least not with respect to a simple frequency criterion, but interfering signals in other frequency ranges can also be filtered out, for example, by electronic filtering during signal evaluation.

When an acoustic band gap is mentioned in the present case, this does not mean a band gap with which only acoustic oscillation modes are filtered out or attenuated. Rather, all oscillation modes, that is to say both the acoustic and the optical oscillation modes, are filtered out or damped.

In a preferred design of the ultrasonic transducer and the ultrasonic flowmeter using this ultrasonic transducer, it is provided that the attenuation region is formed at least along a closed circumferential line in the transition section, so that each path between the ultrasound window and the fastening section of the transducer housing passes through the attenuation region. This measure forces any housing wave potentially capable of passing from the transducer element of one ultrasonic transducer to the transducer element of another ultrasonic transducer to pass through the phononic attenuation region once, or, respectively it encounters such an attenuation region once. Thus, it is not possible for a damaging housing wave to bypass the closed attenuation region.

Another preferred design of the ultrasonic transducer and the ultrasonic flowmeter using this ultrasonic transducer is characterized in that the attenuation region is formed in the fastening section. Potentially harmful housing waves usually pass from one ultrasonic transducer to another ultrasonic transducer through the measuring tube. Since the ultrasonic transducers are presumably at least indirectly connected to the measuring tube via their fastening section, this proposed measure also forces each housing wave to pass through the attenuation region provided there, effectively attenuating the housing wave.

An advantageous further development of the ultrasonic transducer and the ultrasonic flowmeter using this ultrasonic transducer is characterized in that the phononic crystal has a closed cover for sealing the outer space from the inner space of the transducer housing. Phononic crystals can, for example, be made from a single-phase material, or can be made from, for example, a two-phase material. In particular in the case of using single-phase material for realizing phononic crystals, the structures with which phononic crystals are implemented are usually not closed, but in a sense open-pored. Consequently, in this case they are not suitable for implementing a tight barrier between the outer space and the inner space of the transducer housing, wherein the tightness with respect to the medium in the measuring tube must be ensured. Phononic crystals in particular made from single-phase material are implemented, for example, by regular arrangements of mass points, i.e. for example small "spheres", and by constructive cross-pieces connecting these mass points. Between the neighboring mass points there is then—depending on the dimensioning—simply a free space through which a fluid can penetrate. With the proposed cover, the desired tightness of the phononic crystal is achieved. The constructive cross-pieces connecting the mass points, in addition to connecting the mass points, also fulfill the function of increasing the rigidity of the arrangement and thus its mechanical strength. Since the ultrasonic transducer is exposed to high pressures during operation, depending on the process conditions, sufficient mechanical strength is necessary. Furthermore, by dimensioning the cross-pieces and the mass points, the mass mismatch between the cross-pieces and the mass points can be set or influenced. The higher the dimensional contrast between the mass points and the cross-pieces, the higher the frequency range of the band gap of the phononic crystal.

Preferably, in the case of the closed cover, it is provided to provide an implementation of the cover by means of cover material in the spaces between the periodically arranged structural elements of the phononic crystal, in particular in the spaces between the structural elements of the phononic crystal forming the outer layer of the phononic crystal, preferably by means of cover material which is identical to the material of the phononic crystal. When the material of the phononic crystal is also used for the cover, the fabrication of the phononic crystal and the cover sealing it can be carried out simultaneously, which is advantageous in various respects.

In order to further increase the mechanical strength of the ultrasonic transducer in the damping area, a preferred variant of the ultrasonic transducer provides that stiffening elements—particularly preferably in the form of stiffening plates—are integrated into the damping area, with each stiffening element being arranged at least between two mass points of the phononic crystal. The stiffening elements are particularly preferably arranged between mass points that are not directly adjacent. The exact number of stiffening elements and their exact arrangement depends on the desired mechanical strength and on the arrangement of the mass points in the phononic crystal.

In another advantageous embodiment of the ultrasonic transducer and the ultrasonic flowmeter using this ultrasonic transducer, it is provided that the phononic crystal has a simple cubic arrangement or a hexagonal arrangement. The structures are simple and easy to fabricate. The hexagonal arrangement is also distinguished from other geometries in that high mechanical strengths can be achieved with low material input.

In the case of a simple cubic arrangement, the stiffening elements—if provided—are particularly preferably arranged between diagonally opposite mass points. In the case of a hexagonal arrangement, in one variant the stiffening elements—if provided—are particularly preferably arranged between two mass points at a maximum distance in the hexagonal arrangement. In a further variant, a stiffening element preferably connects a mass point with its next but one neighbor.

Another further development of the ultrasonic transducer and the ultrasonic flowmeter using this ultrasonic transducer is characterized in that the attenuation region has at least two phononic crystals with mutually different acoustic band gaps, in particular wherein the mutually different acoustic band gaps are adjacent to one another. This measure makes it possible to provide the attenuation region with multiple band gaps. When the band gaps are adjacent in frequency, it is possible to merge two band gaps into a wider band gap. This effect is most effectively implemented when the at least two phononic crystals are arranged one behind the other in the direction of propagation of the ultrasonic signals through the attenuation region.

It has been found that phononic crystals can be fabricated with good quality (high repeatability in the fabrication of periodically repeating structures) using generative manufacturing processes, at least for band gaps in the ultrasonic range. In this respect, preferred designs of the ultrasonic transducer are characterized in that at least the attenuation region is produced by a generative manufacturing process, in particular by 3D printing.

Particularly preferably, at least the attenuation region is made of corrosion-resistant steel or titanium.

In the ultrasonic flowmeter according to the invention, at least one of the two ultrasonic transducers must be designed as previously described, because it is already then ensured that, in any case, a sound barrier exists between the two ultrasonic transducers in order to at least attenuate housing waves. Better attenuation can be achieved if both ultrasonic transducers are equipped with a phononic crystal attenuation region.

BRIEF DESCRIPTION OF THE DRAWINGS

In detail, there is now a plurality of possibilities for designing and further developing the ultrasonic transducer according to the invention, the ultrasonic flow meters according to the invention and the measuring tube according to the invention. In this regard, reference is made to the description of preferred embodiments in connection with the drawings.

DETAILED DESCRIPTION

Figure 1:
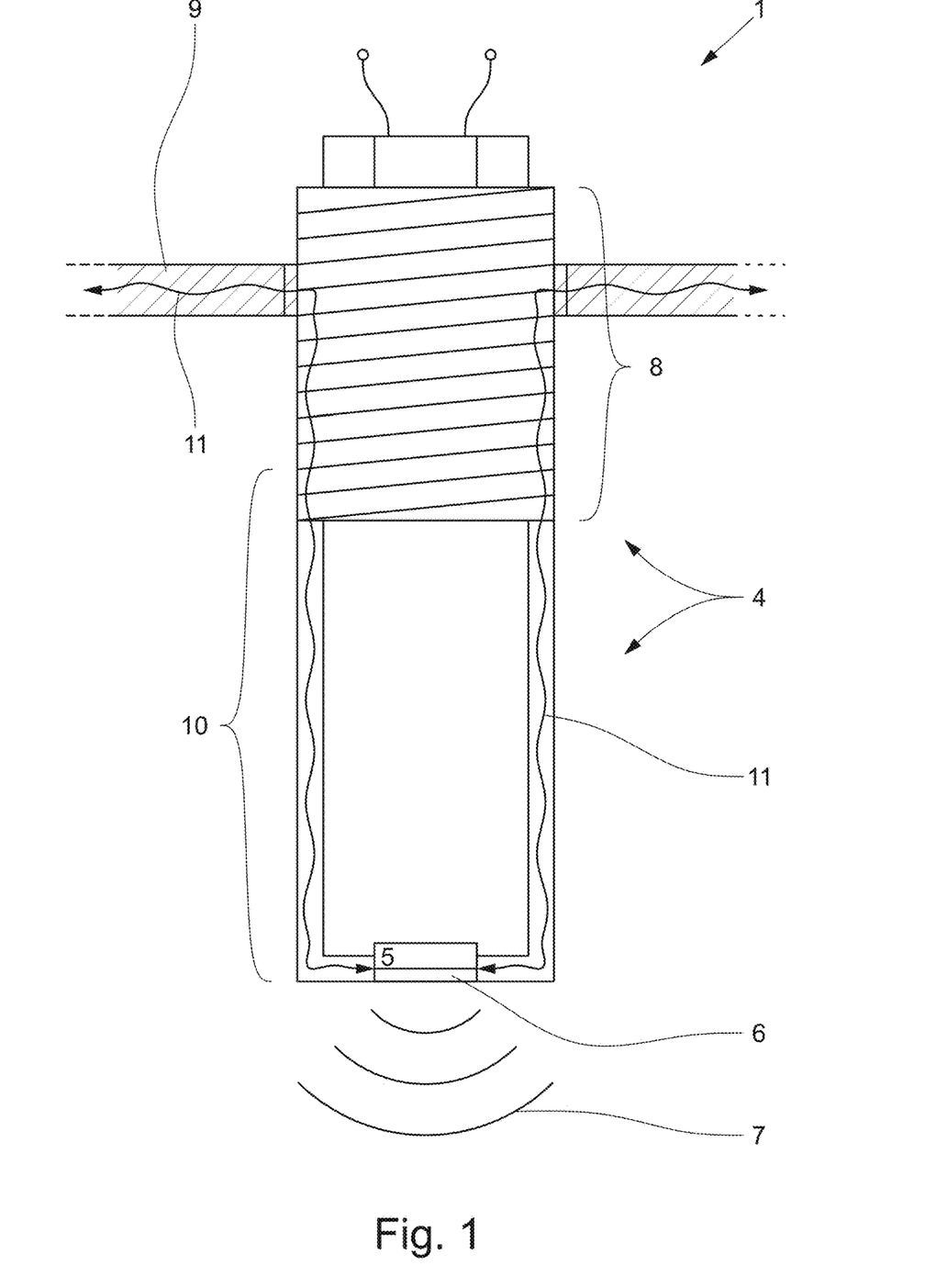
FIG. 1 schematically illustrates an ultrasonic transducer known from the prior art in an installation position.
Figure 2:
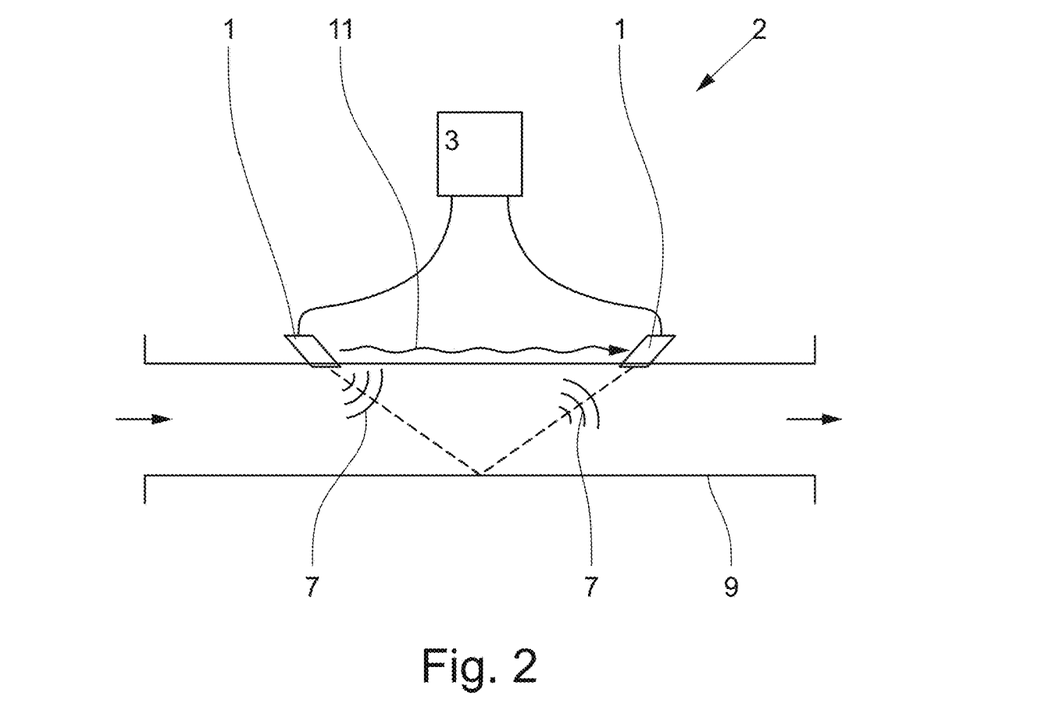
FIG. 2 schematically illustrates an ultrasonic flowmeter with two ultrasonic transducers.

FIG. 1 shows an ultrasonic transducer 1 known from the prior art for an ultrasonic flowmeter 2. FIG. 2 also represents the prior art and shows an ultrasonic flowmeter 2 with two ultrasonic transducers 1 connected to a control and evaluation unit 3.

The ultrasonic transducer 1 shown in FIG. 1 has a sleeve-shaped transducer housing 4. The shape of the transducer housing 4 is not important; quite different designs are known for ultrasonic transducers 1. The concept of the measures according to the invention for the design of ultrasonic transducers 1 (FIGS. 3 to 8) shown below can be implemented independently of the external design. The illustrations in FIG. 1 (and also in the other figures) are to be understood schematically and are intended to clarify the essential facts. Thus, the figures partly show the inner area of the ultrasonic transducers 1, but partly also show the ultrasonic transducers 1 in a top view, i.e. overall in a partial section.

In any case, the ultrasonic transducers 1 shown have in common that a transducer element 5 for generating and/or receiving ultrasonic signals is arranged in the transducer housing 4. These are usually piezo elements. Not shown are further components of ultrasonic transducers 1, which are not important here, for example cabling, circuit boards for signal evaluation, casting, etc.

In any case, the transducer element 5 serves to generate and/or receive ultrasound signals at least in a working frequency range of the ultrasonic transducer 1. For this, the transducer housing 4 has an ultrasound window 6 in the region of the transducer element 5 for transmitting the ultrasonic signals 7 between the interior and the exterior of the transducer housing 4. How the ultrasound window 6 is designed, whether it is made of a different material than that of which the transducer housing 4 is otherwise made, whether it has transmission layers for implementing suitable impedance matching, etc., is not further shown here, nor is it of interest. The ultrasonic signals 7 transmitted to the exterior of the transducer housing 4, or transmitted from the exterior of the transducer housing through the ultrasound window 6 to the transducer element 5, are working signals, since ultrasonic measurement is based on them.

Figure 3:
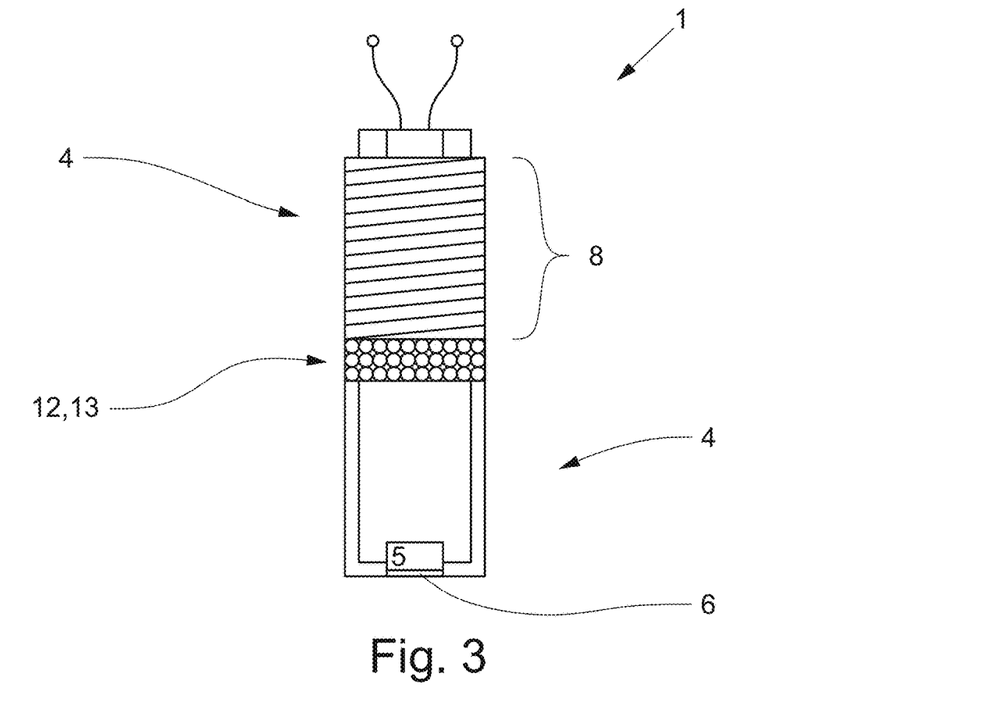
FIG. 3 schematically illustrates an embodiment of an ultrasonic transducer with a phononic crystal in the attenuation region.

The transducer housing 4 has a fastening section 8 for fastening the ultrasonic transducer 1 to a measuring tube 9. In FIGS. 1 and 3, the fastening section comprises threading formed in the wall of the transducer housing 4 for screwing the ultrasonic transducer 1 into its mounting location. In other embodiments, however, the fastening section may also be formed by a flange or mounting projection formed on the transducer housing 4.

A problem in the use of the ultrasonic transducer 1 shown here is that ultrasonic signals reach the transducer element 5 not only in the form of working signals via the outer space of the ultrasonic transducer 1, but also parasitic ultrasonic signals reach the transducer element 5 as housing waves 11 via the transducer housing 4. This is problematic for the reasons already described, since the ultrasonic measurement can be distorted and the quality of the measurement suffers.

FIG. 2 shows the measurement situation with a known ultrasonic flowmeter 2, as it is often used for flow measurement. Here, two ultrasonic transducers 1 are installed in the measuring tube 9 of the ultrasonic flowmeter 2. The ultrasonic signal 7 serving as a working signal is emitted into the outer area of the ultrasonic transducer 1, namely into the medium carried in the measuring tube 9, the flow velocity of which is to be determined by the ultrasonic measurement. However, the receiving ultrasonic transducer 1 shown on the right receives not only the working signal 7, but also the parasitic ultrasonic signals which pass from the ultrasonic transducer 1 on the left to the ultrasonic transducer 1 on the right as housing waves 11. The working and parasitic signals can overlap at the same time and thus become impure in terms of signal form and/or a temporally smeared received signal with poor signal-to-noise ratio, but temporally offset signals can also be received in the working frequency range, so that the measurement result is ambiguous.

To solve the problem of signal crosstalk, it is provided in the ultrasonic transducers 1 for an ultrasonic flowmeter 2 shown in FIGS. 3 to 8 (in different sections and details) that the transition section 10 of the transducer housing 4 has at least one phononic crystal 13 with an acoustic band gap in the working frequency range of the ultrasonic transducer 1 in an attenuation region 12, so that the transmission of ultrasonic signals in the working frequency range between the ultrasound window 6 and the fastening section 8 via the transducer housing 4 is at least attenuated.

Since interference signals in the form of housing waves 11 can compulsorily reach the ultrasound window 6 and thus the transducer element 5 from externally via the fastening section 8 and the transition section 10, an attenuation of interference signals is imperatively achieved by this measure. The same applies, of course, to the reverse path, namely to interference signals that are generated by the transducer element 5 and reach the fastening section 8 parasitically as housing waves 11 from the region of the ultrasonic window 6 via the transducer housing 4 via the transition section 10 and from there reach the structural periphery of the ultrasonic transducer.

In the embodiment shown in FIG. 3, the phononic crystal 13 is processed flush with the other components of the transducer housing 4. In the embodiment shown in FIG. 4, the phononic crystal 13 is somewhat offset by design.

Figure 4:
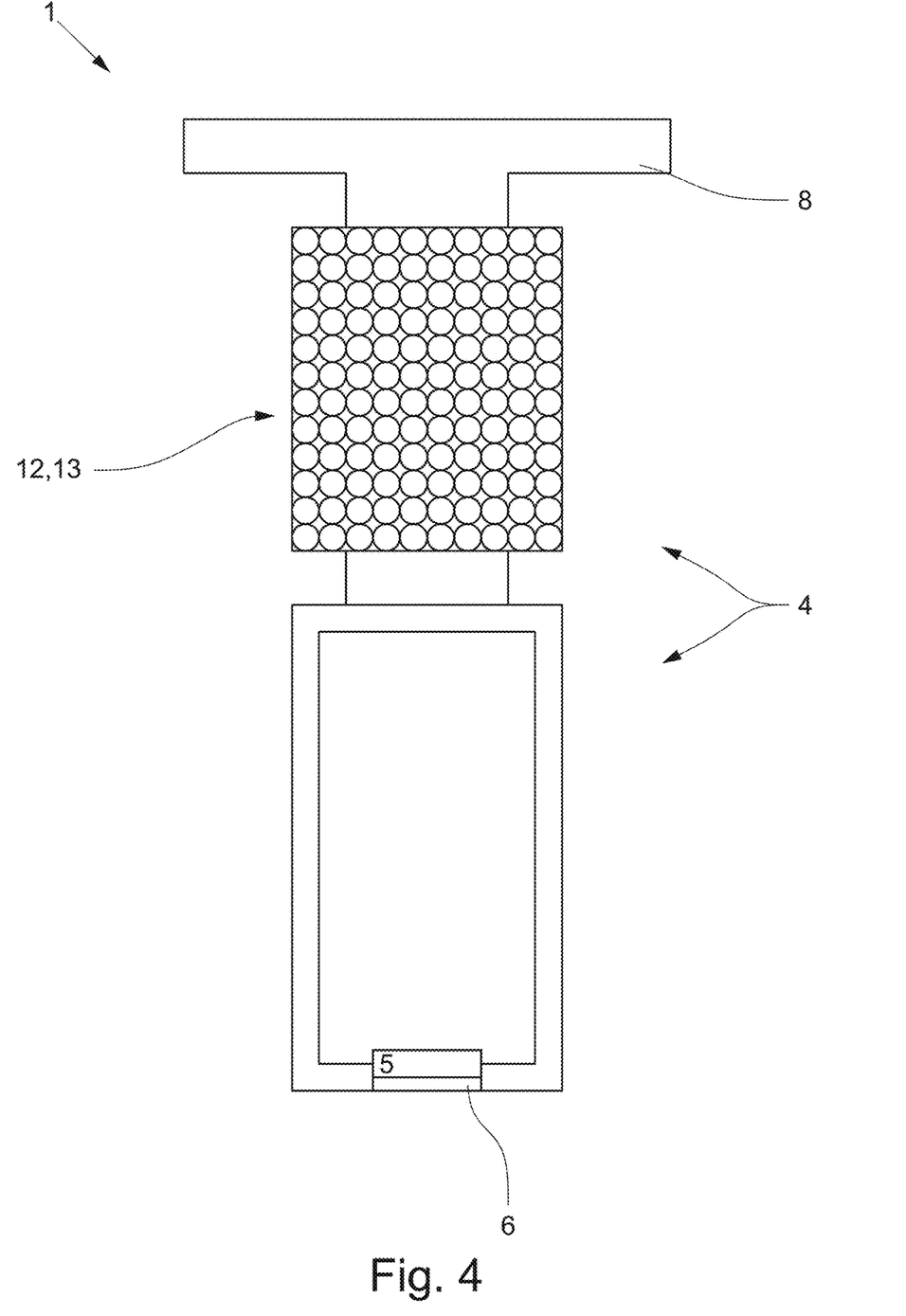
FIG. 4 schematically illustrates a further example of an ultrasonic transducer with a phononic crystal in the attenuation region.

FIGS. 3 and 4 show the advantageous embodiment of an ultrasonic transducer 1 in which the attenuation region 12 is formed along a closed circumferential line in the transition section 10. Under this stipulation, each path between the ultrasound window 6 and the fastening section 8 of the transducer housing 4 passes through the attenuation region 12, so that the best possible attenuation is also necessarily achieved as a result, since the attenuation region 12 cannot be bypassed—even partially—by housing waves.

Figure 5:
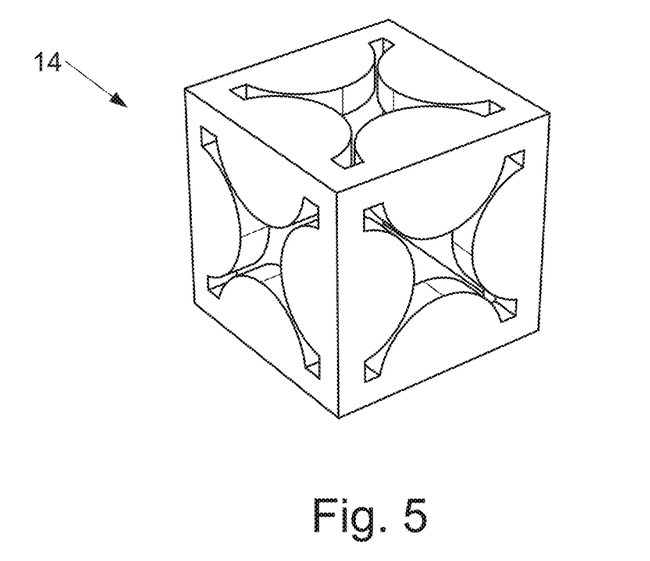
FIG. 5 schematically illustrates the elementary cell of a cubic phononic crystal.

FIG. 5 shows an example of an elementary cell 14 of a cubic phononic crystal 13. The phononic crystal 13 is obtained with its periodic structure by stringing a plurality of the elementary cells 14 close together. However, the complete geometrical description exists in the description of only the elementary cell 14. It is readily conceivable that when several of these elementary cells 14 are lined up side by side, the mass points in this example existing as quarter spheres become complete, closed spheres. These mass points 16 existing as "spheres" 17 are connected to each other by the cross-pieces 18 converging at the corner points of the elementary cell 14. In real implementations of phononic crystals 13 these cross-pieces 18 are, of course, necessary for construction, since the spheres 17 cannot float freely in space. This is at least the case when the phononic crystal 13 is made of a single-phase material, as shown here. The cross-pieces 18 also serve to increase the strength of the arrangement. By choosing the dimensioning of the cross-pieces 18 and the mass points 16, in this case the spheres 17, the mass mismatch between the cross-pieces 18 and mass points 16 can be set.

In any case, it can be seen that there are free spaces in the phononic crystal 13 between the mass points designed as spheres, so a phononic crystal 13 implemented according to this specification is porous to a certain extent. If such a porous phononic crystal 13 were to be used as part of the transducer housing 4 of an ultrasonic transducer 1, there would no longer be a seal between the interior and the exterior of the ultrasonic transducer 1 without further measures, insofar as no other sealing measures had been taken.

In further embodiments, which are not shown here, the mass points 16 can be realized by other geometric structures, for example from cubes.

However, in connection with the design of the phononic crystal 13, it is provided in the embodiments according to FIGS. 3, 4 and 6 to 8 that the phononic crystals 13 shown there have a closed cover 15 for sealing the outer area with respect to the inner area of the transducer housing 4. In these cases, therefore, the phononic crystal 13 designed in this way itself ensures sealing of the transducer housing 4 without the need for additional measures. In addition, the mechanical strength of the phononic crystal 13 is increased by the closed cover 15.

The illustrated embodiments also have in common that the closed cover 15 is implemented with cover material in the spaces between the periodically arranged structural elements (mass points 16, cross-pieces 18) of the phononic crystal 13, wherein the cover material is provided in the spaces between the structural elements of the phononic crystal 13 forming the outer layer of the phononic crystal. This has the effect that the medium adjacent to the transducer housing 4 from the outside cannot penetrate into the empty spaces of the phononic crystal 13, and to this extent the oscillation behavior cannot be influenced by the medium.

Figure 6:
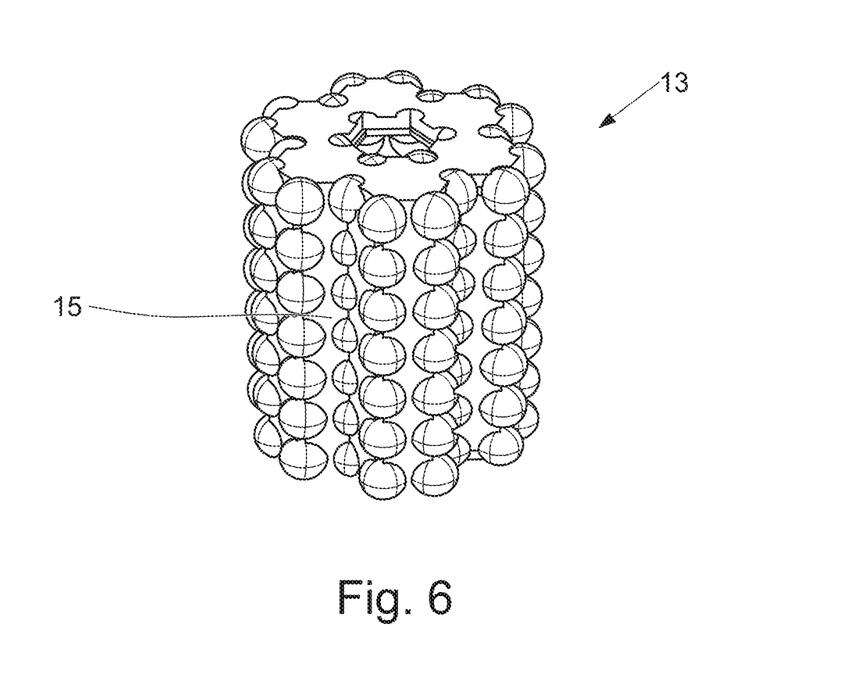
FIG. 6 schematically illustrates an embodiment of a phononic crystal with hexagonal unit cell structure and a band gap.
Figure 7:
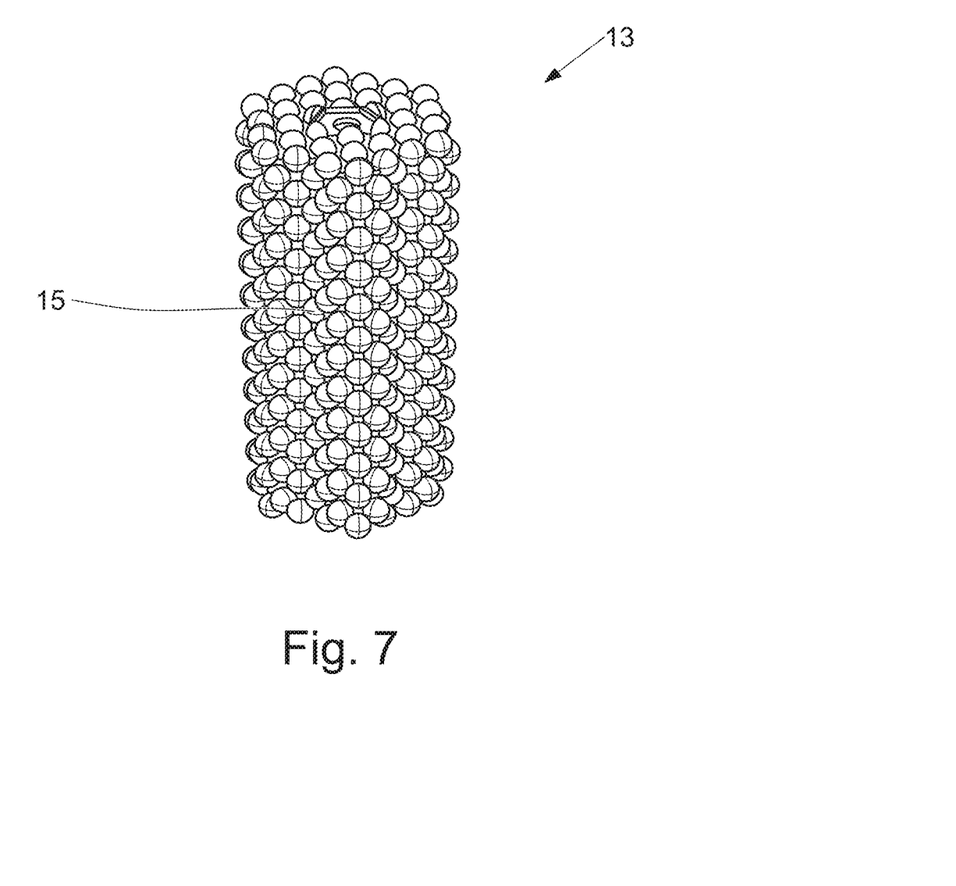
FIG. 7 schematically illustrates another embodiment of a phononic crystal with layers arranged in series with two different band gaps with different frequency ranges.
Figure 8:
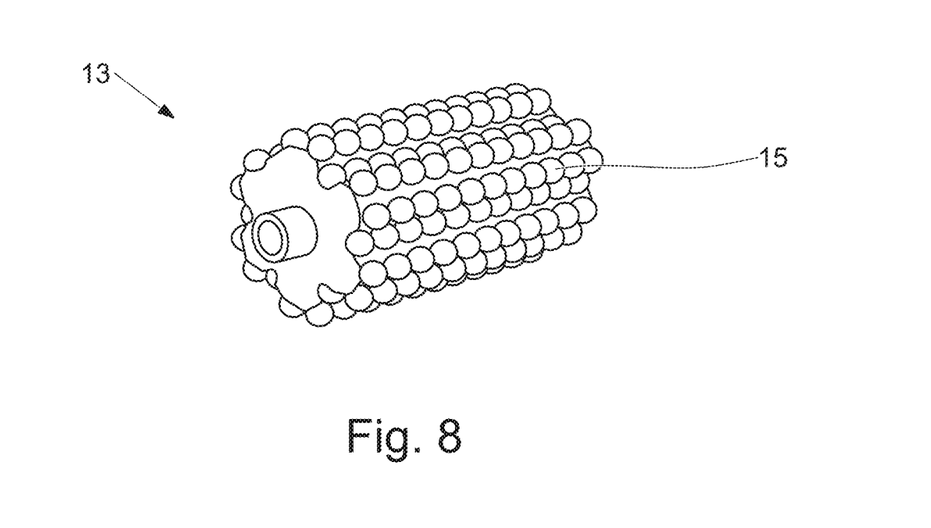
FIG. 8 illustrates a phononic crystal implemented in 3D metal printing with a closed outer cover.

In the embodiments according to FIGS. 6 to 8, the cover 15 is further configured such that the cover material is arranged in the spaces between the periodically arranged structural elements of the phononic crystal 13 such that the portion of the closed cover 15 implemented by the cover material is minimal.

Thus, the influence of the cover material on the oscillation characteristics of the phononic crystal 13 is minimized.

In the embodiments according to FIGS. 6 to 8, the phononic crystal 13 is based on a hexagonal arrangement, which is advantageous in terms of the ratio of mechanical stress resistance and material usage.

In the phononic crystal 13 shown in FIG. 6, a total of seven spherical layers are implemented in the direction of passage of the sonic waves, which are identically constructed and spaced, to this extent the phononic crystal 13 has exactly one band gap of interest.

In the embodiment according to FIG. 7, five elementary cell layers are implemented in series with a first band gap with a central frequency at 1.03 MHz and a further five elementary cell layers with a band gap with a central frequency at 890 kHz. The different band gaps of the successively implemented phononic crystals 13 are adjacent to each other and therefore form a common large band gap of the phononic crystal 13.

In the embodiment in FIG. 8, a phononic crystal 13 can be seen that is produced using a generative manufacturing process, in this case by 3D metal printing.

The advantage here is that both the phononic crystal structure and the cover can be produced in a single manufacturing step.

Figure 9:
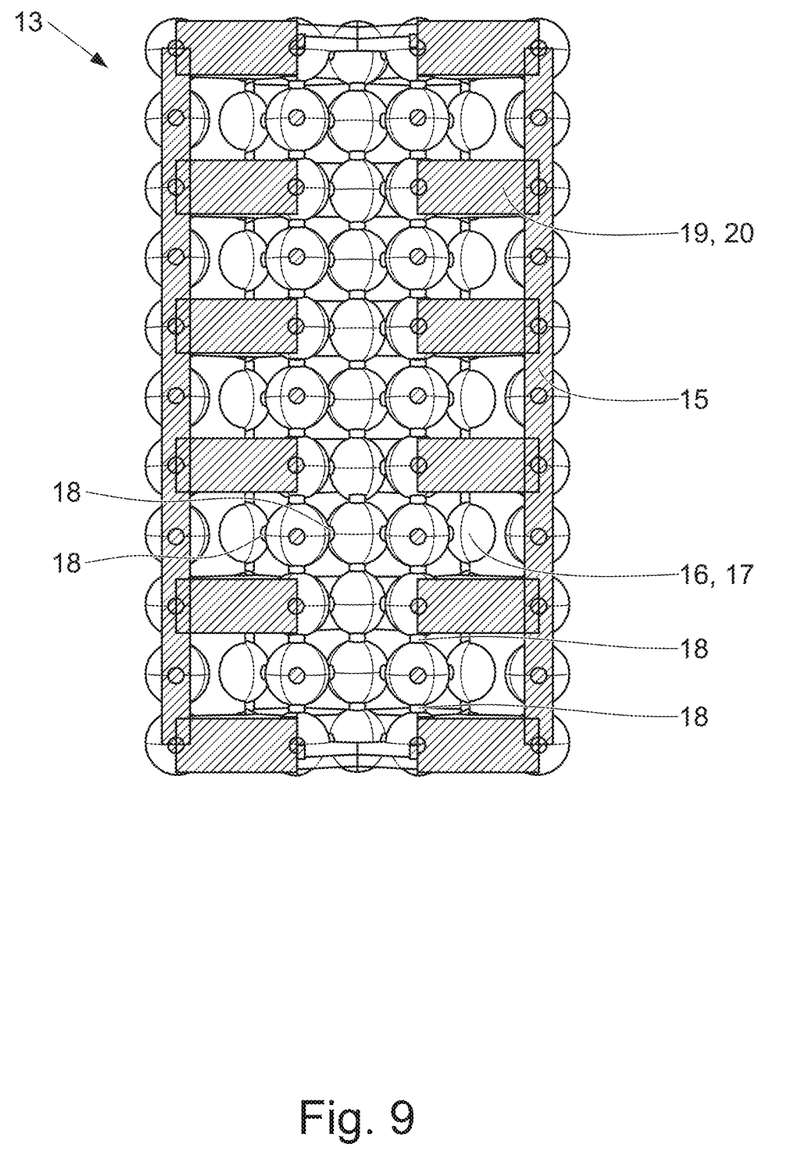
FIG. 9 illustrates a cross section through a phononic crystal.

A cross section through a phononic crystal 13 can be seen in FIG. 9. In the case of the phononic crystal 13 shown here, eleven spherical layers are implemented in the direction of passage of the sonic waves, which—as in the exemplary embodiment shown in FIG. 6—are identically constructed and spaced apart. The phononic crystal 13 is sealed from the outside by the closed cover 15. The mass points 16 realized by the spheres 17 are connected to one another by the cross-pieces 18, the connections between adjacent spheres 17 being realized both within a spherical layer and between two spherical layers. To further increase the mechanical stability, reinforcement elements 19 in the form of reinforcement plates 20 are integrated into the phononic crystal 13. In the present case, the reinforcement plates 20 are integrated into every second spherical layer of the phononic crystal 13 and, in addition, connect two mass points 16 of a spherical layer that are not immediately adjacent and are realized in the form of spheres 17 with one another.

The invention claimed is:

1. An ultrasonic transducer for an ultrasonic flowmeter, comprising:
   a transducer housing; and
   a transducer element arranged in the transducer housing for generating and/or receiving ultrasonic signals at least in a useful frequency range of the ultrasonic transducer;
   wherein the transducer housing has an ultrasound window in the region of the transducer element for transmitting the ultrasound signals between the interior and the exterior of the transducer housing;
   wherein the transducer housing has a fastening section for fastening the ultrasonic transducer to a measuring tube;
   wherein the transducer housing extends with a transition section between the ultrasound window and the fastening section; and
   wherein the transition section of the transducer housing has, in an attenuation region, a phononic crystal with an acoustic band gap in the useful frequency range of the ultrasound transducer, so that the transmission of ultrasonic signals in the useful frequency range between the ultrasound window and the fastening section is at least attenuated.

2. The ultrasonic transducer according to claim 1, wherein the attenuation region is formed at least along a closed circumferential line in the transition section so that each path between the ultrasound window and the fastening section of the transducer housing passes through the attenuation region.

3. The ultrasonic transducer according to claim 1, wherein the attenuation region is formed in the fastening section.

4. The ultrasonic transducer according to claim 1, wherein the phononic crystal is realized by periodically arranged structural elements by mass points and cross-pieces; and
   wherein the cross-pieces connect two adjacent mass points to one another.

5. The ultrasonic transducer according to claim 4, wherein stiffening elements in the form of stiffening plates are integrated for mechanical stabilization in the phononic crystal; and
   wherein the stiffening elements are arranged between not immediately adjacent mass points.

6. The ultrasonic transducer according to claim 1, wherein the phononic crystal has a closed cover for sealing the outer space with respect to the inner space of the transducer housing.

7. The ultrasonic transducer according to claim 6, wherein the closed cover is implemented by cover material in the spaces between the periodically arranged structural elements of the phononic crystal forming the outer layer of the phononic crystal; and
   wherein the cover material which is identical to the material of the phononic crystal.

8. The ultrasonic transducer according to claim 7, wherein the cover material is arranged in the spaces between the periodically arranged structural elements of the phononic crystal in such a way that the part of the closed cover implemented by the cover material is minimal.

9. The ultrasonic transducer according to claim 1, wherein the phononic crystal has a simple cubic arrangement or a hexagonal arrangement.

10. The ultrasonic transducer according to claim 1, wherein the attenuation region has at least two phononic crystals with mutually different acoustic band gaps; and
    wherein the mutually different acoustic band gaps are adjacent to one another.

11. The ultrasonic transducer according to claim 10, wherein the at least two phononic crystals are arranged one behind the other as seen in the propagation direction of the ultrasonic signals through the attenuation region.

12. The ultrasonic transducer according to claim 1, wherein at least the attenuation region is produced by a generative manufacturing process.

13. The ultrasonic transducer according to claim 1, wherein at least the attenuation region is made of steel or titanium.

14. An ultrasonic flowmeter for determining the flow of a medium, comprising:
    at least two ultrasonic transducers; and
    a measuring tube;
    wherein the ultrasonic transducers each have a transducer housing and a transducer element arranged in the transducer housing for generating and/or receiving ultrasonic signals at least in a useful frequency range of the ultrasonic transducer;
    wherein the transducer housing has an ultrasound window in the region of the transducer element for transmitting the ultrasound signals between the interior and the exterior of the transducer housing;
    wherein the transducer housing has a fastening section for fastening the ultrasound transducer to a measuring tube;
    wherein the transducer housing extends with a transition section between the ultrasound window and the fastening section; and
    wherein the transition section of the transducer housing of at least one ultrasound transducer has, in an attenuation region, at least one phononic crystal with an acoustic band gap in the useful frequency range of the ultrasound transducer, so that the transmission of ultrasound signals in the useful frequency range between the ultrasound window and the fastening section is at least attenuated.

15. The ultrasonic flowmeter according to claim 14, wherein the at least one ultrasonic transducer is designed such that at least one of:
- the attenuation region is formed at least along a closed circumferential line in the transition section so that each path between the ultrasound window and the fastening section of the transducer housing passes through the attenuation region
- the attenuation region is formed in the fastening section;
- the phononic crystal is realized by periodically arranged structural elements by mass points and cross-pieces, and the cross-pieces connect two adjacent mass points to one another;
- stiffening elements in the form of stiffening plates are integrated for mechanical stabilization in the phononic crystal, and the stiffening elements are arranged between not immediately adjacent mass points;
- the phononic crystal has a closed cover for sealing the outer space with respect to the inner space of the transducer housing;
- the closed cover is implemented by cover material in the spaces between the periodically arranged structural elements of the phononic crystal forming the outer layer of the phononic crystal, and the cover material is identical to the material of the phononic crystal;
- the cover material is arranged in the spaces between the periodically arranged structural elements of the phononic crystal in such a way that the part of the closed cover implemented by the cover material is minimal;
- the phononic crystal has a simple cubic arrangement or a hexagonal arrangement;
- the attenuation region has at least two phononic crystals with mutually different acoustic band gaps, and the mutually different acoustic band gaps are adjacent to one another;
- the at least two phononic crystals are arranged one behind the other as seen in the propagation direction of the ultrasonic signals through the attenuation region;
- at least the attenuation region is produced by a generative manufacturing process; and
- at least the attenuation region is made of steel or titanium.

\* \* \* \* \*